United States Patent
Chen et al.

(10) Patent No.: US 7,507,439 B2
(45) Date of Patent: Mar. 24, 2009

(54) USE AND PREPARATION OF CROSSLINKED POLYMER PARTICLES FOR INKJET RECORDING MATERIALS

(75) Inventors: Tienteh Chen, San Diego, CA (US); Eric L. Burch, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 93 days.

(21) Appl. No.: 10/840,741

(22) Filed: May 6, 2004

(65) Prior Publication Data

US 2005/0249896 A1 Nov. 10, 2005

(51) Int. Cl.
*B05D 5/04* (2006.01)
*B32B 5/16* (2006.01)

(52) U.S. Cl. .................. 427/180; 428/308.4; 428/308.8

(58) Field of Classification Search ................. 428/206, 428/308.4, 308.8; 427/180
See application file for complete search history.

(56) References Cited

U.S. PATENT DOCUMENTS

| | | | |
|---|---|---|---|
| 4,104,208 A | 8/1978 | Kido et al. | |
| 4,314,032 A | 2/1982 | Murayama et al. | |
| 4,863,972 A | 9/1989 | Itagaki et al. | |
| 5,108,596 A * | 4/1992 | Ookuma et al. ........... | 210/198.2 |
| 5,120,601 A * | 6/1992 | Kotaki et al. ............. | 428/32.35 |
| 5,139,867 A * | 8/1992 | Light ....................... | 428/32.15 |
| 5,190,997 A | 3/1993 | Lindemann et al. | |
| 5,360,780 A * | 11/1994 | Okumura et al. ........... | 503/227 |
| 5,811,488 A | 9/1998 | Narumoto et al. | |
| 5,837,754 A * | 11/1998 | Shimomura et al. ........ | 523/161 |
| 5,972,474 A * | 10/1999 | Tsuzuki et al. ............. | 428/141 |
| 6,045,917 A * | 4/2000 | Missell et al. ............. | 428/32.29 |
| 6,180,209 B1 | 1/2001 | Sato et al. ................... | 428/141 |
| 6,332,679 B1 * | 12/2001 | Higuma et al. .............. | 347/102 |
| 6,383,500 B1 | 5/2002 | Wooley et al. .............. | 424/401 |
| 6,497,481 B1 | 12/2002 | Landry-Coltrain et al. | |
| 6,506,478 B1 * | 1/2003 | Schulz ....................... | 544/58.5 |
| 6,554,418 B2 | 4/2003 | Lawrence et al. | |
| 6,605,337 B1 * | 8/2003 | Mori et al. ................ | 428/195.1 |
| 6,677,007 B1 * | 1/2004 | Warner et al. ............. | 428/32.34 |
| 6,685,999 B2 * | 2/2004 | Ichinose et al. .......... | 428/32.25 |
| 6,692,799 B2 | 2/2004 | Waller, Jr. | |
| 6,761,943 B1 * | 7/2004 | Warner et al. ............. | 428/32.32 |
| 6,911,239 B2 * | 6/2005 | King et al. ................ | 428/32.25 |
| 7,074,495 B2 * | 7/2006 | Tamagawa et al. ........ | 428/537.5 |
| 7,189,279 B2 * | 3/2007 | Guillet ........................ | 75/343 |
| 7,335,407 B2 * | 2/2008 | Landry-Coltrain et al. ....................... | 428/32.25 |
| 2001/0043240 A1 * | 11/2001 | Gotou et al. .................... | 347/4 |
| 2003/0077429 A1 | 4/2003 | Schulz | |
| 2003/0138604 A1 * | 7/2003 | Landry-Coltrain et al. .. | 428/195 |
| 2003/0138605 A1 * | 7/2003 | Landry-Coltrain et al. .. | 428/195 |
| 2004/0061764 A1 * | 4/2004 | O'Connor et al. ........... | 347/105 |

FOREIGN PATENT DOCUMENTS

| | | |
|---|---|---|
| EP | 0 802 245 A1 | 10/1997 |
| EP | 1 321 301 A2 | 6/2003 |
| EP | 1 400 367 A2 | 3/2004 |
| JP | 2004-34689 | 2/2004 |
| JP | 2004-130744 | 4/2004 |
| JP | 2005-89492 | 4/2004 |

OTHER PUBLICATIONS

McCutcheon's Emulsifiers & Detergents, vol. 1, North American Edition, MC Publishing Co. (1998).

Lovell, P.A., et al., Ed., "Emulsion Polymerization and Emulsion Polymers," John Wiley & Sons, Chichester, England, 1997, pp. 700-722.

* cited by examiner

*Primary Examiner*—Susan W Berman

(57) ABSTRACT

A method of forming a print medium having porous and swellable properties. The method includes providing a coating formulation that has at least 50% by weight of crosslinked organic particles. The crosslinked organic particles have a particle size of less than approximately 1 μm. The coating formulation is then applied to a substrate. The crosslinked organic particles may be formed from polyvinylalcohol, polyvinylpyrrolidone, gelatin, polyester, polyamine, polyimide, starch, cellulose, polyethylene oxide, polypropylene oxide, and mixtures thereof. The crosslinked organic particles may be formulated to absorb at least two times their weight of water. A print medium utilizing the crosslinked organic particles is also disclosed.

21 Claims, 1 Drawing Sheet

USE AND PREPARATION OF CROSSLINKED POLYMER PARTICLES FOR INKJET RECORDING MATERIALS

FIELD OF THE INVENTION

The present invention relates to using organic pigments in an inkjet print medium. More specifically, the present invention relates to using crosslinked polyvinylalcohol particles or crosslinked polyvinylpyrrolidone particles in the print medium.

BACKGROUND OF THE INVENTION

Print media used in inkjet printing are typically categorized into two groups: porous media and swellable media, with each of the groups having particular advantages and disadvantages. For instance, porous media have an ink-receiving layer that is formed from inorganic or organic materials, such as porous, inorganic particles or porous, organic particles. The porous particles are bound with a binder. The inorganic particles are typically silica- or aluminum-based compounds, such as silicon oxides or aluminum oxides, while organic polymers, such as polyvinylpyrrolidone, are used in the organic particles. When inkjet ink is applied to a porous medium, the inkjet ink is absorbed into the pores of the particles. A colorant in the inkjet ink is fixed in the porous medium by mordants incorporated in the ink-receiving layer or by the surface of the inorganic or organic particles. Porous media have a short dry time and good resistance to smearing because the inkjet ink is easily absorbed into the pores of the ink-receiving layer. However, porous media do not have good resistance to airfade or good lightfastness. In addition, porous media that use organic particles can have poor gloss. In swellable media, the ink-receiving layer is a continuous layer of a swellable, polymer matrix. The polymer used in the swellable matrix is typically water-soluble or swellable, such as polyvinyl alcohol ("PVA"), polyvinylpyrrolidone ("PVP"), or gelatin. When the inkjet ink is applied to the swellable medium, the inkjet ink is absorbed by swelling of the polymer matrix and the colorant is immobilized inside the continuous layer. Since the colorant is protected from the outside environment, swellable media have greater resistance to light and dark/air fade and better color gamut than the porous media. However, the swellable media generally have reduced smearfastness and a longer drytime than porous media.

PVA or PVP is a component of many porous media. For instance, PVA or PVP is typically used in small amounts as the binder in the porous media. The PVA or PVP bind together the inorganic or organic materials, which are present in the porous medium to absorb the inkjet ink. PVA is an inexpensive, commercially available material and has been formed by many techniques, such as by an alcoholysis reaction of polyvinylacetate ("PVAc") with a basic catalyst.

PVA has also been used as a packing material in gel chromatography. When used as a packing material, the PVA is commonly crosslinked. Crosslinked PVA has been produced by a variety of techniques, such as by reacting PVA with a crosslinking agent; suspending a mixture of PVAc, an organic solvent, and a diluent in a nonsolvent and crosslinking the particles; and suspension polymerizing PVAc with a crosslinking agent and a diluent. However, these techniques produce crosslinked PVA in a gel form or produce particles of crosslinked PVA that have a large particle size, such as a particle size of 10 μm-1000 μm. The large particle size is necessary to provide sufficient capacity to separate compounds that are passed through a column of the crosslinked PVA particles. However, this large particle size is not desirably used in inkjet print media because the color density of the resulting print medium is lower compared to that of a swellable medium.

Another problem with these techniques of forming crosslinked PVA is that the crosslinking agents are susceptible to hydrolysis when exposed to alkali or basic conditions. The alkali conditions used to hydrolyze the PVAc to PVA also hydrolyze the crosslinking agents. Severing the bound crosslinking agent causes the crosslinked PVA particles to disintegrate and lose their shape, forming a soft gel. Therefore, to maintain a hard, porous PVA structure, the soft gel is subjected to a post-crosslinking process, which typically uses epichlorohydrin to re-crosslink the crosslinking agents.

It would be desirable to provide porous or nonporous, crosslinked organic particles that have high porosity, fast ink absorption rate, and high color density.

BRIEF SUMMARY OF THE INVENTION

The present invention relates to a method of producing particles of crosslinked PVA. The method includes polymerizing at least one vinylester monomer, at least one crosslinking monomer, and at least one cationic monomer to form a polyvinylester.

The polyvinylester is hydrolyzed to form a crosslinked PVA particle having a particle size of up to approximately 10 μm.

The present invention also relates to a method of forming a print medium having porous and swellable properties. The method includes providing a coating formulation that has at least 50% by weight of crosslinked organic particles. The crosslinked organic particles have a particle size of less than approximately 1 μm. The coating formulation is then applied to a substrate.

The present invention also relates to a print medium for use in inkjet printing. The print medium includes a substrate and an ink-receiving layer having crosslinked organic particles. The crosslinked organic particles have a particle size of less than approximately 1 μm and are present in a coating formulation at at least approximately 50% by weight.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1:
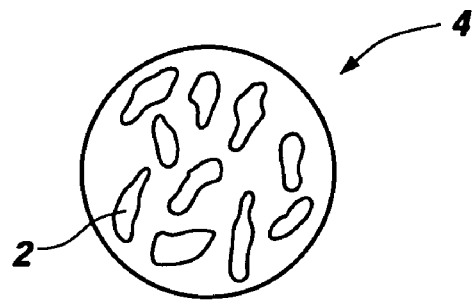
FIG. 1 illustrates an embodiment of crosslinked PVA particles of the present invention.

Crosslinked organic particles for use in a print medium are provided. The crosslinked organic particles may be present in a coating formulation of the print medium in an amount greater than or equal to approximately 50% by weight. The crosslinked organic particles may have a particle size of less than approximately 1 μm. The crosslinked organic particles may be porous or nonporous. The crosslinked organic particles may be formed from a water soluble polymer that is swellable. As used herein, the term "swellable" refers to a polymer that is capable of absorbing at least two times its weight of water or ink solvent. For instance, the polymer may be capable of absorbing at least four times its weight of water. When the polymer is crosslinked, the polymer may be insoluble in water. However, the polymer may remain swellable when crosslinked. As such, the crosslinked organic particles may swell when exposed to inkjet ink. However, the crosslinked organic particles may stop swelling before dissolving in the inkjet ink and, therefore, may maintain their integrity as particles.

The crosslinked organic particles may be crosslinked polymers that include, but are not limited to, PVA, PVP, gelatin, polyester, polyamines, polyimides, starch, cellulose, and polyalkylene oxides, such as polyethylene oxide or polypropylene oxide. In addition, physical mixtures of the crosslinked polymers may be used or the mixtures may be copolymerized mixtures. For instance, the crosslinked organic particles may be crosslinked PVA, crosslinked PVP, or mixtures thereof.

In one embodiment, the crosslinked organic particles are crosslinked PVA particles having a small particle size. Particles of the crosslinked PVA may be up to approximately 5 μm in diameter. In one embodiment, the crosslinked PVA particles have a particle size of up to approximately 1 μm in diameter. The crosslinked PVA particles may be prepared by reacting at least one vinylester monomer, at least one crosslinking monomer, at least one cationic monomer, and, optionally, a diluent or porogen to form particles of a polyvinylester. The polyvinylester particles are subsequently hydrolyzed to produce the crosslinked PVA particles. The crosslinked PVA particles may be PVA gel particles. The vinylester monomer may have the following structure:

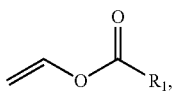

where $R_1$ is hydrogen; a linear, branched, or cyclic $C_1$-$C_{12}$ alkyl group; an aryl group; or an arylalkyl group. The alkyl group may include, but is not limited to, a methyl group, an ethyl group, or a propyl group. The aryl group may be a benzyl group. For sake of example only, the vinylester monomer may include, but is not limited to, vinylformate, vinylacetate, vinylpropionate, vinylbenzoate, vinylpivalate, vinyl-2-ethylhexanoate, vinylmethacrylate, vinylneodecanoate, vinylneononanoate, vinylversatate, vinyllaurate, vinylstearate, vinylmyristate, vinylbutyrate, and vinylvalerate. In one embodiment, the vinylester monomer is vinylacetate.

The crosslinking monomer may be stable to base or alkali so that the crosslinking monomer does not hydrolyze under alkali conditions. In other words, the crosslinking monomer is resistant to hydrolysis under these conditions. The crosslinking monomer may also be capable of crosslinking the vinylester monomer and the cationic monomer. The crosslinking monomer may be a compound having the following structure:

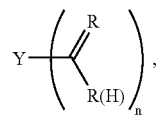

where R is hydrogen or a $C_1$-$C_4$ alkyl group, n is an integer from 2 to 6, and Y is a linking group that is resistant to hydrolysis under basic or acidic conditions. The linking group, Y, may have the following structures:

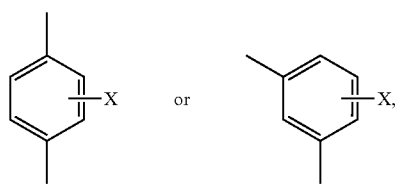

where X is hydrogen, a halogen, or a $C_1$-$C_4$ alkyl group. Y may also have the following structure:

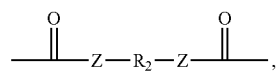

where Z is NH, $R_2$ is a linear alkyl, branched alkyl, cyclic alkyl, aryl, or arylalkyl group having from 1 to 20 carbon atoms.

The crosslinking monomer may include, but is not limited to, divinylbenzene, N,N'-methylenebis(acrylamide), N,N'-ethylenebis(acrylamide), N,N'-propylenebis(acrylamide), N,N'-butamethylenebis(acrylamide), N,N'-diallylacrylamide, N,N'-hexamethylenebisacrylamide, triallylisocyanurate, 1,4-diacryloylpiperazine-1,1,1-trimethylolpropane diallyl ether, triethylene glycol divinyl ether, diallyl maleate, bis(acryloylamido)methane, ethyleneglycoldimethacrylate, diethyleneglycoldimethacrylate, and 3-(acryloyloxy)-2-hydroxypropyl methacrylate. In one embodiment, divinylbenzene or bis(acryloylamido)-methane is used as the crosslinking monomer.

The cationic monomer may be used to fix a colorant in the inkjet ink to the print medium. Monomers used to introduce cationic units into the crosslinked PVA particles may have the following structure:

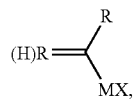

where R is each independently H or a substituted or unsubstituted alkyl group of 1 to 4 carbon atoms, M is a group containing a cationic charge, and X is an anion or a mixture of anions. Exemplary structures for M include, but are not limited to:

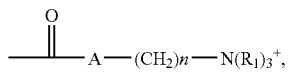

where A is either O or NH, each $R_1$ is independently selected from an alkyl, cyclic alkyl, or aryl group having from 1 to 20 carbon atoms, and n is an integer from 2 to about 12. Alternatively, M may have the following structure:

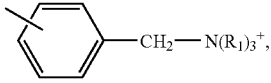

where $R_1$ is defined as above. In addition to the substituents indicated, the aromatic ring may also include an alkyl group of from 1 to 4 carbon atoms, a phenyl group, a benzyl group, or a second, fused ring. M may also include the following structure:

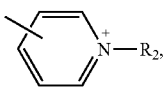

where $R_2$ represents H or an alkyl, cyclic alkyl, or alkoxy group having from 1 to 20 carbon atoms. In addition to the substituents indicated, the aromatic ring may also include an alkyl group of from 1 to 4 carbon atoms, a phenyl group, a benzyl group, a halide group or a second, fused ring. M may also have the following structure:

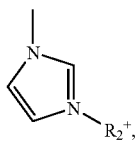

where $R_2$ represents H or an alkyl, cyclic alkyl, or alkoxy group having from 1 to 20 carbon atoms. In addition to the substituents indicated, the aromatic ring may also include an alkyl group of from 1 to 4 carbon atoms, a phenyl group, a benzyl group, a halide group, or a second, fused ring.

X may be an anion or a mixture of anions including, but not limited to, a halide (e.g., chloride or bromide), an alkylsulfate (e.g. methylsulfate), an alkylsulfonate (e.g. methylsulfonate), or an arylsulfonate (e.g. benzenesulfonate or toluenesulfonate). In one embodiment, X is chloride or methylsulfate.

The cationic monomer may include, but is not limited to, (m,p-vinylbenzyl)trimethylammonium chloride, protonated vinylimidazole, methylated vinylimidazole, 2-acrylolyloxyethyltrimethyl-ammonium chloride, 2-acrylolyloxyethyltrimethylammonium methyl sulfate, and 3-acrylamidopropyltrimethylammonium chloride. In one embodiment, 3-acrylamidopropyltrimethylammonium chloride is used as the cationic monomer.

As shown in the following reaction scheme, the vinylester monomer, the crosslinking monomer, and the cationic monomer may be polymerized to form particles of the crosslinked polyvinylester:

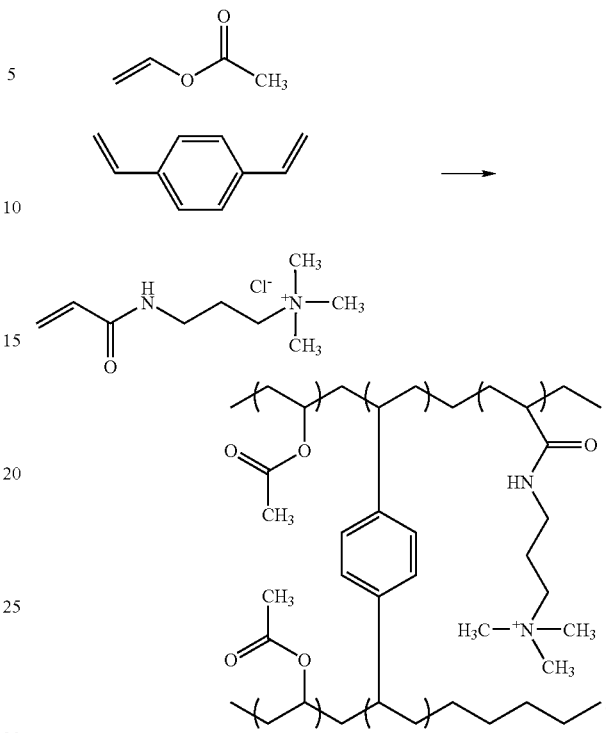

The vinylester monomer may be present from approximately 50% by weight ("wt %") to approximately 99 wt %, the crosslinking monomer may present from approximately 5 wt % to approximately 20 wt %, and the cationic monomer may be present from approximately 0 wt % to approximately 10 wt %. The polyvinylester may be a latex of polyvinylester. While this reaction scheme shows vinylacetate as the vinylester, divinylbenzene as the crosslinking monomer, and 3-acrylamidopropyltrimethylammonium chloride as the cationic monomer, it is understood that the vinylester monomer, the crosslinking monomer, and the cationic monomer may be any of the compounds previously described.

Emulsion, miniemulsion, or suspension polymerization may be used to produce the polyvinylester particles. Emulsion polymerization is known in the art and is described in "Emulsion Polymerization and Emulsion Polymers," edited by P. A. Lovell and M. S. El-Aasser, John Wiley and Sons (1997). The vinylester monomer, the crosslinking monomer, the cationic monomer, and an ionic, low molecular weight surfactant are then added to the aqueous medium, forming a preemulsion. An initiator is also added to the aqueous medium. The vinylester monomer, the crosslinking monomer, and the cationic monomer enter and attach to the center of the micelle. Initiation of the polymerization reaction occurs when the initiator migrates into the micelle. The polyvinylester grows from the micelle until it achieves a desired size. The particle size of the polyvinylester prepared by emulsion polymerization may be from approximately 0.1 μm to approximately 0.5 μm. Therefore, using emulsion polymerization to form the polyvinylester may ultimately provide crosslinked PVA having a particle size of less than approximately 0.5 μm.

Miniemulsion polymerization is described in "Emulsion Polymerization and Emulsion Polymers," edited by P. A. Lovell and M. S. El-Aasser, John Wiley and Sons (1997), p.

700-721. Miniemulsion polymerization is similar to emulsion polymerization except that a cosurfactant, such as a short-chain alcohol (e.g. pentanol) or a long chain alkane (e.g. hexadecane), is needed in addition to the ionic, low molecular weight surfactant. Miniemulsions are typically formed by subjecting the vinylester monomer, the crosslinking monomer, the cationic monomer, water, the ionic, low molecular weight surfactant, and the cosurfactant to a high shear field. The high shear field may be created by devices such as an ultrasonifier, a homogenizer, or a microfluidizer. These devices rely on mechanical shear and/or cavitation to break an oil phase into submicron size droplets. The miniemulsion droplets containing the vinylester monomer, the crosslinking monomer, and the cationic monomer are polymerized to form polymer particles having identical particle size as the miniemulsion droplets. A water soluble initiator or an oil soluble initiator may be used to initiate the polymerization. Desirably, an oil soluble initiator is used to minimize the undesired nucleation of the polymer particles in water. A diluent may also be added to the monomer solution to introduce porosity to the particles. The particle size of the polyvinylester prepared by miniemulsion polymerization may range from approximately 0.1 μm to approximately 1.0 μm.

In suspension polymerization, a solution of the vinylester monomer, the crosslinking monomer, the cationic monomer, a polymeric dispersant or protective colloid, and water is forced through a high shearing device, such as an ultrasonifier, a homogenizer, or the Microfluidizer. The particle size is determined by the design of the high shearing device, the shearing time, and the shearing speed. The polymeric dispersant may include, but is not limited to, PVA, polyacrylic acid, sodium polystyrenesulfonate, cellulose, gelatin, alga, and colloidal silica. A diluent may also be added to the monomer solution to introduce porosity to the particles. The polymerization may be initiated by a water soluble initiator or an oil soluble initiator. The solution is heated above the decomposition temperature of the initiator to initiate polymerization of the monomer emulsion droplets. The particle size of the resulting polyvinylester is the same size as the droplets of the solution of the vinylester monomer, the crosslinking monomer, and the cationic monomer. In suspension polymerization, the particle size of the polyvinylester ranges from approximately 0.5 μm to approximately 10 μm. The particle size of the crosslinked PVA that is ultimately formed from the polyvinylester also ranges from approximately 0.5 μm to approximately 10 μm.

Emulsion polymerization, miniemulsion polymerization, and suspension polymerization are known in the art. Therefore, an experimental setup and reaction conditions used in the polymerization reaction, such as temperature and pressure conditions, may be selected by one of ordinary skill in the art. The surfactants, cosurfactants, initiators, dispersants, diluents, solvents, and stabilizers used in these polymerization techniques are also known in the art and, therefore, may be selected by one of ordinary skill in the art. In emulsion polymerization, a water soluble initiator is desirable. Examples of water soluble initiators include, but are not limited to, salts of persulfate, redox initiators, such as persulfate and metabisulfite, and water soluble azo initiators, such as 2,2'-azobis(2-methylpropionamide)dihydrochloride, 2,2'-azobis[N-(2-carboxyethyl)-2-methylpropionamidine]tetrahydrate, 2,2'-azobis(2-[1-(2-hydroxyethyl)-2-imidazolin-2-yl]propane)dihydrochloride, 2,2'-azobis(2-ethylpropionamide)dihydrochloride. For miniemulsion polymerization and suspension polymerization, an oil soluble initiator is desirable. Example of oil soluble initiators include, but are not limited to, an acylperoxide, an alkylperoxide, a peroxy ester, or an azo compound. The acylperoxide may include, but is not limited to, laurylperoxide, benzoylperoxide and acetylperoxide. The alkylperoxide may include, but is not limited to, di-tert-butylperoxide and dicumylperoxide. The peroxy ester may include, but is not limited to, tert-butylperoxybenzoate, tert-butylperoxyacetate, and tert-butylperoxyoctoate. The azo compound may include, but is not limited to, azobisisobutyronitrile, azobisisovaleronitrile, 2,2'-azobis(4-methoxy-2,4-dimethyl valeronitrile), 2,2'-azobis(2, 4-dimethyl valeronitrile), dimethyl 2,2'-azobis(2-methylpropionate), 2,2'-azobis(2-methylbutyronitrile), 1,1'-azobis (cyclohexane-1-carbonitrile), 2,2'-azobis[N-(2-propenyl)-2-methylpropionamide], 1-[(cyano-1-methylethyl)azo] formamide, 2,2'-azobis(N-butyl-2-methylpropionamide), and 2,2'-azobis(N-cyclohexyl-2-methylpropionamide).

Surfactants used in the emulsion polymerization or the miniemulsion polymerization may include anionic, cationic, or nonionic surfactants, as described in "McCutcheon's Emulsifiers & Detergents," vol. 1, North American Edition, MC Publishing Co. (1997), the contents of which are hereby incorporated by reference. The anionic surfactant may include, but is not limited to, sodium dodecyl sulfate, sodium dodecyl bezenesulfonate, $C_{14}$-$C_{16}$ olefin sulfonate, sodium dodecyl diphenyloxide disulfonate, ammonium or sodium lauryl ether sulfate, hexadecylsulfate, an ammonium salt of sulfated nonylphenoxy polyethyleneoxide, sodium alkylphenyl ethoxylate sulfate, a dioctyl ester of sodium sulfosuccinic acid, a disodium ethoxylated alcohol nonylphenol half ester of sulfosuccinic acid, and dicyclohexyl ester of sodium sulfosuccinic acid, a quaternary surfactant, such as cetyltrimethylammonium bromide, hexadecyltrimethylammonium chloride, cetyltrimethylammonium chloride, a nonionic surfactant, such as a block copolymer of propylene oxide and ethylene oxide, octylphenoxypolyethoxy-ethanol, nonylphenoxypolyethoxyethanol, and $C_{11}$-$C_{15}$ secondary alcohol ethoxylate.

A cosurfactant for the miniemulsion polymerization may be a long chain alkane, such as hexadecane, pentadecane, heptadecane, dodecane, or nonane, an alcohol, such as pentanol, hexanol, heptanol, dodecanol, octanol, nonanol, or cetyl alcohol. Desirably, cetyl alcohol or hexadecane are used as the cosurfactant.

As shown in FIG. 1, pores 2 or voids may be formed in the polyvinylester particles during the polymerization reaction, as described above. The pores 2 may provide additional space in the crosslinked PVA particles into which the inkjet ink penetrates or is absorbed. Pores 2 may also be present in the crosslinked PVP particles. The term "crosslinked organic particles" is used herein to refer to the crosslinked PVA particles or the crosslinked PVP particles. The pores 2 may occupy from approximately 0% to approximately 60% of the volume of the crosslinked organic particles 4. For instance, the pores 2 may occupy from approximately 5% to approximately 50% of the volume of the crosslinked organic particles 4. If the pores 2 are present in the crosslinked PVA particles, the pores 2 may be produced by using at least one diluent during the formation of the polyvinylester particles. The diluent may be an organic solvent in which the vinylester monomer, the crosslinking monomer, and the cationic monomer are soluble. However, the polyvinylester produced by the polymerization reaction may not be soluble in the diluent. Therefore, as the polyvinylester is formed, a phase separation occurs between the polyvinylester and the diluent, producing pockets of the diluent in the polyvinylester. Once the polyvinylester is formed, the diluent may be evaporated by heating the polyvinylester particles, producing the pores 2 in positions where the diluent was previously present.

The diluent may include, but is not limited to, ethyl acetate, propyl acetate, toluene, nitromethane, acetonitrile, methacresol, pyridine, benzyl alcohol, aniline, nitrobenzene, cyclohexanone, methyl acetate, bromobenzene, chlorobenzene, trichloroethylene, chloroform, methyl ethyl ketone, furfural, benzene, butyl acetate, carbon tetrachloride, acetic amide, and mixtures thereof; i-propanol, n-propanol, butanol, xylene, ethyl ether, n-heptyl alcohol, dichlorobenzene, pinacolin, amyl alcohol, and mixtures thereof; and ethyleneglycohol, hexanol, n-butyl ether, carbon disulfide, glycerine, cyclohexane, solvent naphtha, n-hexane, n-heptane, n-octane, turpentine oil, and mixtures thereof. Desirably, the diluent is ethyl acetate or toluene.

A size of the pore 2 may be controlled by adjusting an amount of the diluent that is used. In general, as the amount of diluent is increased, the size of the pore 2 increases. In other words, a volume occupied by the pore 2 increases. Conversely, as the amount of the diluent decreases, the size of the pore decreases. The diluent may be present from approximately 10 wt % to approximately 50 wt %. The pores 2 in the crosslinked organic particles 4 may range from approximately 50 Å to approximately 5,000 Å in size.

The polyvinylester particles formed by emulsion, miniemulsion, or suspension polymerization may be hydrolyzed to form particles of the crosslinked PVA, as shown in the following reaction scheme:

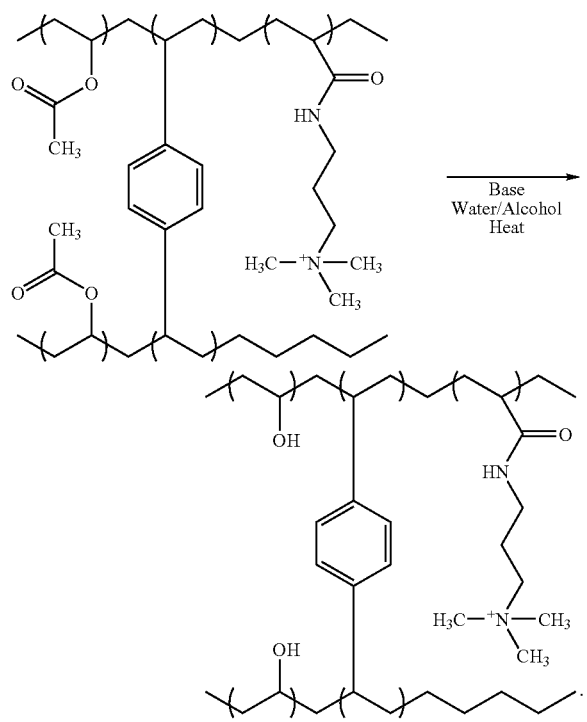

The polyvinylester may be hydrolyzed under alkali conditions, such as by using an alkali agent in the presence of water and an alcohol. The alkali agent may include, but is not limited to, sodium hydroxide, potassium hydroxide, or lithium hydroxide. The alcohol may be methanol, ethanol, isopropanol, 1-propanol, butanol, and pentanol. Desirably, the alcohol is methanol. The amount of alcohols used for the hydrolysis of polyvinylester is from 5 to 50% relative to the amount of water. Appropriate temperature and pressure conditions may be used to hydrolyze the polyvinylester. Heating may be used to facilitate the hydrolysis of the polyvinylester and the side product of the hydrolysis may be distilled out. Hydrolysis of the polyvinylester may be performed at a temperature ranging from approximately 30° C. to approximately 100° C. A sufficient amount of the alkali agent may be used to hydrolyze substantially all of the polyvinylester into the crosslinked PVA particles. For instance, a stoichiometric amount of the alkali agent may be added to the polyvinylester with heating to hydrolyze the polyvinylester particles. As shown in the reaction scheme, the alkali agent hydrolyzes acetate groups of the polyvinylester into alcohol groups to form the polyvinylalcohol. However, crosslinking groups provided by the crosslinking monomers are not hydrolyzed by the alkali agent. Since the PVA particles remain crosslinked during the hydrolysis reaction, the shape of the polyvinylester particles is maintained as the crosslinked PVA particles are formed. Therefore, the crosslinked PVA particles do not disintegrate as is seen with conventional crosslinked PVA, such as that used for chromatography. The crosslinked PVA particles of the present invention may also include at least one cationic monomer group.

The crosslinked PVA particles may be further crosslinked using a conventional crosslinking reagent, such as boric acid, formaldehyde, glyoxal, glutaraldehyde, epichlorohydrin, and triallylisocyanarate.

The crosslinked PVA particles produced by the method of the present invention may have a substantially spherical shape and a particle size of up to approximately 10 μm, such as from approximately 0.1 μm to approximately 10 μm. For instance, the particle size of the crosslinked PVA particles may range from approximately 0.2 μm to approximately 5 μm, such as from approximately 0.2 μm to approximately 1 μm. The crosslinked PVA particles may also have a transition temperature ("$T_g$") of at least 60° C. so that the crosslinked PVA particles do not collapse when used at ambient temperatures.

The crosslinked PVA particles may also be obtained by dispersing an aqueous solution of PVA in a water immiscible organic solvent with a low HLS surfactant to form a water-in-oil emulsion. The mixture of the PVA aqueous solution, the water immiscible organic solvent, and the low HLS surfactant may be forced through a high shearing device, such as an ultrasonifier, a homogenizer, or a Microfluidizer, to form droplets of the PVA aqueous solution dispersed in the organic solvent. The particle size may be determined by the design of the high shearing device, the shearing time, and the shearing speed and may range from approximately 5 μm to approximately 100 μm. A water soluble crosslinker, such as boric acid, borate, formaldehyde, glutaric dialdehyde, glyoxal, acetaldehyde, succinic dialdehyde, trimethylol melamine, urea-formaldehyde, epichlorohydrine, or triallyl isocyanurate, may be added to the mixture to crosslinked the PVA dispersion. Water soluble solvents, such as methanol, ethanol, acetone, methyl ethyl ketone, tetrahydrofuran, formic acid, ethylene glycol, nitromethane, DMSO, or DMF, may be added to the aqueous PVA solution to introduce the porosity. Water and solvents are evaporated or spin dried to isolate the crosslinked PVA particles. An organic solvent that is not water miscible may be used as a continuous phase for the dispersion of the PVA solution. A dispersant may be used to disperse the PVA, such as a low HLB surfactant (having an HLB of less than approximately 6). The dispersant may include, but is not limited to, a block copolymer of propyleneoxide and ethyleneoxide, a block copolymer of dimethylsiloxane and ethyleneoxide, a terpolymer of dimethylsiloxane, ethyleneoxide and propyleneoxide, octylphenoxypolyethoxyethanol, nonylphenoxypolyethoxyethanol, a $C_{11}$-$C_{15}$ secondary alcohol ethoxylate, and a sorbitan derivative.

In another embodiment, the crosslinked organic particles 4 are crosslinked PVP particles having a small particle size. The crosslinked PVP particles may have a particle size of less than approximately 1 μm. The crosslinked PVP particles may be synthesized by conventional techniques. Alternatively, the crosslinked PVP particles may be available commercially as Polyclar® from International Specialty Products (Wayne, N.J.). Polyclar® is a hygroscopic, crosslinked, amorphous PVP having a swell volume ranging from approximately 4 ml/g to approximately 8 ml/g in water and is insoluble in water, acids, bases, and organic solvents. Viviprint™ PS-10, which is a 15 μm crosslinked PVP and is also available from International Specialty Products, may also be used in the print medium 8. The particle size of the commercially available, crosslinked PVP particles may be reduced to less than approximately 1 μm before use in the print medium 8 by conventional grinding techniques including, but not limited to, media milling and microfluidization. The crosslinked PVP particles may be used in the print medium 8 in a similar manner as described for the crosslinked PVA particles.

The crosslinked organic particles 4 may be used in the print medium as synthesized or in their commercially available form. Alternatively, the crosslinked organic particles 4 may be dried to produce a powder, such as by spin drying, spray drying, or freeze drying. This powdered form of the crosslinked polymer may also be used in the print medium 8. By using crosslinked organic particles 4 having a small particle size, the crosslinked organic particles 4 may be closely packed in the print medium 8. Therefore, an image printed on the print medium 8 may have less scattering than would be present with crosslinked polymers having a larger particle size. The printed image may also have a fast drying time, good lightfastness, and good resistance to airfade. Therefore, the print medium 8 of the present invention has the advantages of both porous media and of swellable media. In addition, the gloss of the printed image may be controlled by adjusting the particle size of the crosslinked organic particles 4. By using crosslinked organic particles 4 at the low end of the particle size range previously described, the gloss of the printed image may be high. Using crosslinked organic particles 4 at the high end of the particle size range may produce printed images having a faster drytime; however, the gloss of the printed image may be reduced.

Figure 2:
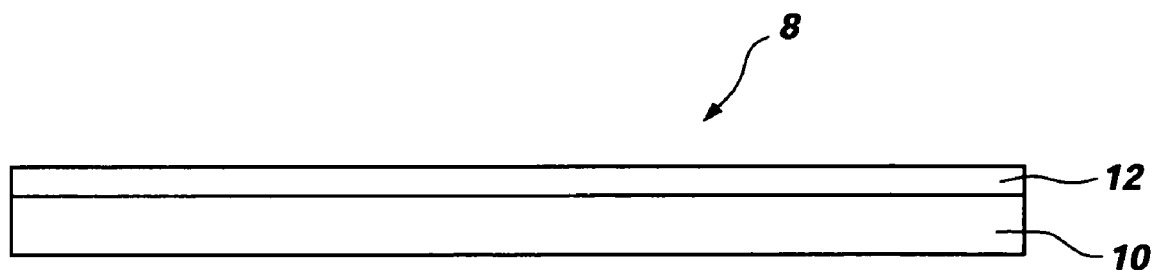
FIG. 2 illustrates an embodiment of a print medium of the present invention.

The print medium 8 may include a substrate 10 and an ink-receiving layer 12, as shown in FIG. 2. The substrate 10 may be a transparent, opaque, or translucent material, such as a photobase or a paperbase, which provides support to the ink-receiving layer 12 as the print medium 8 is transported through an inkjet printer. The substrate 10 may be a hard or flexible material made from a polymer, a paper, a glass, a ceramic, a woven cloth, or a non-woven cloth material. The substrate 10 may include, but is not limited to, a paper, a resin-coated paper, a polyester, or a microporous material. Opaque substrates 10 include plain paper, coated paper, synthetic paper, photographic paper support, melt-extrusion-coated paper, and laminated paper, such as biaxally oriented support laminates. Transparent substrates 10 include glass; cellulose derivatives, such as cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The substrate 10 may optionally include additives, such as antioxidants, antistatic agents, and plasticizers.

The ink-receiving layer 12 may include the crosslinked organic particles 4, such as the crosslinked PVA particles or the crosslinked PVP particles, as a major component. The crosslinked organic particles 4 may absorb the inkjet ink that is applied to the print medium 8. Therefore, the crosslinked organic particles 4 may have a different function compared to the non-crosslinked organic pigments used in conventional print media, which are used as binders. The ink-receiving layer 12 may optionally include additional components, such as at least one of a binder, cationic mordant, or inorganic particles, to obtain the desired properties in the ink-receiving layer 12. For instance, the ink-receiving layer 12 may include at least one binder, such as a water-soluble or water-dispersible binder. The binder may be present in the ink-receiving layer 12 in an amount sufficient to form a film while maintaining the pores 2 in the crosslinked organic particles 4. The binder may be crosslinked before or after coating the ink-receiving layer 12 on the substrate 10. Examples of binders include, but are not limited to, PVA that is not crosslinked, gelatin, polyvinylpyrrolidone that is not crosslinked, a copolymer of PVA with polyethyleneoxide, a cationic PVA, an acetoacetylated PVA, a silylated PVA, a polyurethane dispersion, a polyester dispersion, or a synthetic latex having $T_g$ lower than 30° C.

At least one cationic mordant may be present in the ink-receiving layer 12. Examples of cationic mordants that may be used in the ink-receiving layer 12 include, but are not limited to, poly(DDAMAC), trivalent salts, polyamines, or a cationic latex. The ink-receiving layer 12 may include a small amount of inorganic particles, such as silica- or aluminum-based particles. Examples of the inorganic particles include, but are not limited to, silicon oxides and aluminum oxides. The ink-receiving layer 12 may also optionally include fade inhibitors, stabilizers, plasticizers, surfactants, pH adjusting agents, thickeners, dispersing agents, and/or lubricants to obtain the desired properties in the ink-receiving layer 12.

The coating formulation of the ink-receiving layer 12 may be formed by combining the crosslinked PVA particles or the crosslinked PVP particles and any additional components with agitation, as known in the art. The coating formulation may include from approximately 50 wt % to approximately 100 wt % of the crosslinked organic particles 4. For instance, the crosslinked organic particles 4 may be present in the coating formulation in an amount of at least approximately 70 wt %. If at least one binder is used in the ink-receiving layer 12, the binder may be present in the coating formulation from approximately 5 wt % to approximately 20 wt %. If at least one cationic mordant is used in the ink-receiving layer 12, the coating formulation may include from approximately 5 wt % to approximately 20 wt % of the cationic mordant. If inorganic particles, such as silica or alumina, are used in the ink-receiving layer 12, the coating formulation may include from approximately 5 wt % to approximately 30 wt % of the inorganic pigments.

The coating formulation may be diluted and applied to the substrate 10 using conventional coating techniques including, but not limited to, blade coating, air knife coating, rod coating, wound wire rod coating, roll coating, slot coating, slide hopper coating, gravure, and curtain coating. The coating formulation may be applied to the substrate 10 as a single layer or as two or more layers. The print medium 8 may be formed by separately producing and adhering the substrate 10 to the ink-receiving layer 12 by conventional techniques.

Alternatively, the print medium 8 may be formed in a one-step process, where the ink-receiving layer 12 and the substrate 10 are coextruded, stretched, and integrally connected during formation. The print medium 8 may optionally include additional layers, such as additional ink-receiving layers, that do not include the crosslinked organic particles 4.

When dried, the coating formulation may produce the ink-receiving layer 12 having voids in an amount ranging from approximately 0.3 cc/g to approximately 2.0 cc/g as determined by gas adsorption or mercury porisimetry. These techniques are known in the art and are not described in detail herein.

The substrate 10 may have a thickness ranging from approximately 50 μm to approximately 500 μm, such as from approximately 75 μm to approximately 300 μm. The ink-receiving layer 12 may be present on the substrate 10 in an amount sufficient to provide the desired image quality. The ink-receiving layer 12 may be applied to the substrate 10 at a thickness ranging from approximately 2 g/m$^2$ to approximately 44 g/m$^2$, which corresponds to a dry thickness of approximately 2 μm to approximately 40 μm. The ink-receiving layer 12 may include from approximately 50% to approximately 95% of the crosslinked organic particles 4.

The print medium 8 may be used in an inkjet printing process to print images. A dye- or pigment-based, black or color inkjet ink may be applied to the print medium 8 to produce the desired image. The inkjet ink may penetrate into the ink-receiving layer 12 and absorb into the pores 2 of the crosslinked organic particles 4. The inkjet ink may also cause the crosslinked organic particles 4 to swell, which immobilizes the colorant in the ink-receiving layer 12. Since the crosslinked organic particles 4 are porous, the printed image may have a fast drying time, similar to the drying time of a conventional porous medium. In addition, since the crosslinked organic particles 4 are swellable, the image may have lightfastness and resistance to airfade properties that are similar to that of conventional swellable media. In addition, the cationic monomer groups in the crosslinked PVA particles or the crosslinked PVP particles may further increase the water fastness, humid bleed fastness, and humid color fastness because the cationic monomer groups fix the colorant in the inkjet ink to the print medium 8. Finally, the small particle size of the crosslinked organic particles 4 provides improved image quality and gloss to the printed image.

The inkjet ink may absorb into the ink-receiving layer 12 of the present invention approximately two times faster than its absorption into an ink-receiving layer that does not include the crosslinked organic particles 4. The quick absorption of the inkjet ink below the surface of the ink-receiving layer 12 may prevent smearing. In addition, dark air fade of the inkjet ink printed on the ink-receiving layer 12 of the present invention, as measured by changes in optical density, may be within approximately 50 times that of the inkjet ink printed on an ink-receiving layer that does not include the crosslinked organic particles 4.

EXAMPLES

Example 1

Preparation of Nonporous PVA Particles by Miniemulsion Polymerization

To synthesize polyvinylacetate particles, 100 g of vinylacetate, 10 g of p-divinylbenzene, 5 g of 2-acrylolyloxyethyltrimethylammonium chloride, 4 g of hexadecane, 0.5 g of lauryl peroxide, 1 g of sodium dodecyl allyl sulfosuccinate (TREM LF-40), and 460 g of deionized water are mixed with a lab stirrer to form a pre-emulsion. The pre-emulsion is then passed through a Microfluidizer (Model HC-2000 by Microfluidics) three times at 2000 pounds per square inch ("psi"). The miniemulsion obtained is transferred to a 1 liter 3-neck flask equipped with a mechanical stirrer, a nitrogen inlet, and a condenser. The flask is immersed in a constant temperature bath maintained at 60° C. The polymerization is continued for six hours. The polyvinylacetate particles are cooled to room temperature and filtered through a 200 mesh sieve. The final particles have an average particle size of 210 nm.

To hydrolyze the polyvinylacetate particles, 100 g of methanol and 46.5 g of sodium hydroxide (1 equivalent to vinylacetate monomer) are added to the polyvinylacetate particles obtained above. The mixture is heated to 80° C. and refluxed for three hours. A distillation column is attached to distill off methanol, methylacetate, and other organic side products. A stable, translucent dispersion is obtained. The nonporous PVA particles are isolated as a powder with a freeze dryer. The nonporous PVA particles are not soluble in water, methanol, or other organic solvents.

Example 2

Preparation of Porous PVA Particles by Miniemulsion Polymerization

To synthesize polyvinylacetate particles, 100 g of vinylacetate, 10 g of N,N'-methylenebisacrylamide, 5 g of 2-acrylolyloxyethyltrimethyl-ammonium chloride, 4 g of cetyl alcohol, 40 g of ethyl acetate, 0.5 g of lauryl peroxide, 1 g of sodium dodecyl allyl sulfosuccinate (TREM LF-40), and 460 g of deionized water are mixed with a lab stirrer to form a pre-emulsion. The pre-emulsion is passed through a Microfluidizer (Model HC-2000 by Microfluidics) three times at 2000 psi. The miniemulsion obtained is as transferred to a 1 liter 3-neck flask equipped with a mechanical stirrer, a nitrogen inlet, and a condenser. The flask is immersed in a constant temperature bath maintained at 60° C. The polymerization is continued for six hours. The resulting polyvinylacetate particles are cooled to room temperature and filtered through a 200 mesh sieve. The final particles have an average particle size of 245 nm.

To hydrolyze the polyvinylacetate particles, 100 g of methanol and 46.5 g of sodium hydroxide (1 equivalent to vinylacetate monomer) are added to the polyvinylacetate particles obtained above. The mixture is heated to 80° C. and refluxed for three hours. A distillation column is attached to distill off methanol, methylacetate, and other organic side products. A stable translucent dispersion is obtained. The porous PVA particles are isolated as a powder with a freeze dryer. The porous PVA particles are not soluble in water, methanol, or other organic solvents. The average particle size of the porous PVA particles is 220 nm and the porosity is 25%, as measured by a nitrogen adsorption method (BET).

Example 3

Preparation of Porous PVA Particles by Suspension Polymerization

To synthesize polyvinylacetate particles, 100 g of vinylacetate, 10 g of divinylbenzene, 5 g of (m,p-vinylbenzyl)trimethylammonium chloride, 40 g of ethyl acetate, 1 g of lauryl peroxide, 2 g Aerosol OT-100® (dioctyl ester of sodium sulfosuccinic, acid), and 460 g of deionized water are mixed with a lab stirrer to form a pre-emulsion. The pre-emulsion is then passed through a Microfluidizer (Model HC-2000 by Microfluidics) three times at 2000 psi to form a fine dispersion. The suspension obtained is transferred to a 1 liter 3-neck flask equipped with a mechanical stirrer, a nitrogen inlet, and a condenser. The flask is immersed in a constant temperature bath maintained at 60° C. The polymerization is continued for six hours. The resulting cationic polyvinylacetate particles are cooled to room temperature and filtered through a 200 mesh sieve. The final particles have an average particle size of 0.6 μm.

The polyvinylacetate particles are hydrolyzed to polyvinylalcohol particles by the same method described in example 2. The resulting porous PVA particles have an average particle size of 0.56 μm and a porosity of 30% as measured by the nitrogen adsorption method (BET).

Example 4

Preparation of Porous PVA Particles by Suspension Polymerization (Limited Coalescence Technique)

To synthesize polyvinylacetate particles, 100 g of vinylacetate, 10 g of divinylbenzene, 5 g of (m,p-vinylbenzyl)trimethylammonium chloride, 40 g of ethyl acetate, 1 g of lauryl peroxide are mixed until the solution became clear. To this solution, 10.4 g of Ludox TM, 2 ml of 10% poly(adipic acid-co-methylaminoethanol) and 460 g of deionized water are added and stirred with a lab stirrer to form a pre-emulsion. The pre-emulsion is passed through a Microfluidizer (Model HC-2000 by Microfluidics) ten times at 2000 psi to form a fine dispersion. The suspension obtained is transferred to a 1 liter 3-neck flask equipped with a mechanical stirrer, a nitrogen inlet, and a condenser. The dispersion is stirred at room temperature for three hours. Afterward, the flask is immersed in a constant temperature bath maintained at 60° C. and polymerized for six hours. The resulting polyvinylacetate particles are cooled to room temperature. The particles have an average particle size of 2.5 μm.

The polyvinylacetate particles are hydrolyzed to the polyvinylalcohol particles by the same method described in example 2. Ludox TM is also washed off in this step by sodium hydroxide. The resulting porous PVA particles have an average particle size of 2.4 μm and a porosity of 30%.

Example 5

Preparation of PVA Particles by Post Curing Method

PVA particles are prepared by dissolving 3 g of sorbitan monoleate in 400 g Isopar M (from Exxon) with gentle stirring. 100 g of 15% Mowiol 18-88 (PVA from Clariant) solution in water are added with stirring until a stable pre-emulsion is obtained. The pre-emulsion is passed through a Microfluidizer (Model HC-2000 from Microfluidics) ten times at 2000 psi to form a fine emulsion of a PVA solution in Isopar M. The emulsion is transferred to a mechanical stirrer and 25 g of 3% glyoxal and 0.5 g of epichlorohydrin are added. The mixture is heated to 40° C. and stirred for an additional three hours. The crosslinked PVA particles are isolated with a centrifuge. The average particle size is 6 μm.

Example 6

Preparation of an Inkjet Print Medium Including PVA Particles

To prepare an inkjet print medium containing the crosslinked PVA particles, 20 g of the PVA particles described in Example 3 are added slowly to a solution containing 150 of deionized water, 6.25 g of Mowiol 18-88 (15% in water), 5 g of Ludox CL, 3 g of Trudot DPX-8389-33 (cationic latex from MeadWestvaco), and 1 g of Triton X-100 (5% solution). The mixture is stirred until a homogeneous dispersion was obtained. The mixture is applied to a 9 mil photobase paper with a #120 Mylar bar to give an estimated coatweight of 25 gram/m². The coating is dried with a heat gun to provide a glossy, inkjet print medium.

An Hewlett-Packard Deskjet 970 inkjet printer is used to print a test plot on the print medium. The print medium has a faster ink absorption rate than a conventional swellable medium. In addition, the color density and image quality are comparable to the conventional swellable medium.

Example 7

Preparation of an Inkjet Print Medium Including PVP Particles

To prepare an inkjet print medium containing the crosslinked PVP particles, a coating formulation having 10% total solids was prepared. The total solids included 94.75% Viviprint™ PS-10, 5% Clariant Mowiol® 26-88 PVA binder, and 0.25% boric acid crosslinker. The Viviprint™ PS-10, Mowiol® 26-88, and 0.25% boric acid crosslinker were prepared as aqueous solutions and then combined to produce the 94.75/5/0.25 ratio. The coating formulation was applied to a resin coated, paper substrate. The coating was dried with a heat gun to provide a glossy, inkjet print medium referred to as "Formulation 1."

An Hewlett-Packard Deskjet 970 inkjet printer was used to print a test plot on the print medium. For comparative purposes, test plots were also printed on HP Premium Plus Photo Media and HP Photo Paper. Drytime and airfade were measured for each of the test plots by conventional techniques. The results of the drytimes and the airfade are shown in Table 1.

TABLE 1

Drytime and Airfade of Formulation 1.

| | HP Premium Plus Photo Medium | HP Photo Paper | Formulation 1 |
|---|---|---|---|
| Dry to Touch (Rank) | 4 | 5 | 5 |
| 4 Week Air Fade-optical density loss (pure cyan) | 0.4 | 23.9 | 4.1 |
| 4 Week Air Fade-optical density loss (pure magenta) | 0.2 | 38.0 | 2.6 |
| 4 Week Air Fade-optical density loss (pure yellow) | 2.7 | 17.4 | 1.6 |

Example 8

Preparation of an Inkjet Print Medium Including PVP Particles

An inkjet print medium is prepared as described above, except that the crosslinked PVP used in the coating formulation has a particle size of less than approximately 1 μm. To achieve a particle size of less than approximately 1 μm, Viviprint™ PS-10 or Polyclar® is ground to the desired size as known in the art.

An Hewlett-Packard Deskjet 970 inkjet printer is used to print a test plot on the print medium. The print medium has a faster ink absorption rate than a conventional swellable medium. In addition, the color density and image quality are comparable to the conventional swellable medium While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of forming a print medium having porous and swellable properties, comprising:
   providing a coating formulation comprising at least 50% by weight of crosslinked organic particles based on the coating formulation weight, wherein the crosslinked organic particles are porous, have a particle size of less than approximately 1 μm; and are selected from the group consisting of: polyvinylalcohol particles, gelatin particles, polyamine particles, polyimide particles, cellulose particles, polyethylene oxide particles, polypropylene particles, derivatives thereof, and mixtures thereof; and
   applying the coating formulation to a substrate.

2. The method of claim 1, wherein providing a coating formulation comprising at least 50% by weight based on the coating formulation weight of crosslinked organic particles comprises providing a coating formulation comprising at least 50% by weight of crosslinked polyvinylalcohol particles.

3. The method of claim 1, wherein providing a coating formulation comprising at least 50% by weight of crosslinked organic particles comprises providing a coating formulation comprising crosslinked organic particles that are formulated to absorb at least two times their weight of water.

4. The method of claim 1, wherein providing a coating formulation comprising at least 50% by weight of crosslinked organic particles comprises providing a coating formulation comprising crosslinked organic particles that are formulated to absorb at least four times their weight of water.

5. The method of claim 1, wherein providing a coating formulation comprising porous, crosslinked organic particles comprises providing crosslinked organic particles having pores that occupy up to approximately 60% of a volume of the crosslinked organic particles.

6. The method of claim 1, wherein providing a coating formulation comprising at least 50% by weight of crosslinked organic particles comprises
   providing a coating formulation having from approximately 70% by weight to approximately 100% by weight of the crosslinked organic particles.

7. The method of claim 1, further comprising providing at least one of a binder, a cationic mordant, or inorganic particles in the coating formulation.

8. The method of claim 7, wherein providing at least one of a binder, a cationic mordant, or inorganic particles in the coating formulation comprises providing the binder at from approximately 5% by weight to approximately 20% by weight based on the coating formulation weight.

9. The method of claim 7, wherein providing at least one of a binder, a cationic mordant, or inorganic particles in the coating formulation comprises providing the cationic mordant at from approximately 5% by weight to approximately 20% by weight based one the coating formulation weight.

10. A method of forming a print medium having porous and swellable properties, comprising:
    providing a coating formulation comprising approximately 70% by weight to approximately 100% by weight of crosslinked organic particles based on the coating formulation weight, wherein the crosslinked organic particles are porous, have a particle size of less than approximately 1 μm; and are selected from the group consisting of: polyvinylalcohol particles, gelatin particles, polyamine particles, polyimide particles, cellulose particles, polyethylene oxide particles, polypropylene particles, derivatives thereof, and mixtures thereof; and
    applying the coating formulation to a substrate.

11. A method of forming a print medium having porous and swellable properties, comprising:
    providing a coating formulation comprising at least 50% by weight of crosslinked organic particles based on the coating formulation weight, wherein the crosslinked organic particles are porous, have a particle size of less than approximately 1 μm; and are selected from the group consisting of: polyvinylalcohol particles, gelatin particles, polyamine particles, polyimide particles, cellulose particles, polyethylene oxide particles, polypropylene particles, derivatives thereof, and mixtures thereof;
    providing at least one of a binder, a cationic mordant, or inorganic particles in the coating formulation, wherein providing at least one of a binder, a cationic mordant, or inorganic particles in the coating formulation comprises providing the binder at from approximately 5% by weight to approximately 20% by weight based on the coating formulation weight; and
    applying the coating formulation to a substrate.

12. A method of forming a print medium having porous and swellable properties, comprising:
    providing a coating formulation comprising at least 50% by weight of crosslinked organic particles based on the coating formulation weight, wherein the crosslinked organic particles are porous, have a particle size of less than approximately 1 μm; and are selected from the group consisting of: polyvinylalcohol particles, gelatin particles, polyamime particles, polyimide particles, cellulose particles, polyethylene oxide particles, polypropylene particles, derivatives thereof, and mixtures thereof;
    providing at least one of a binder, a cationic mordant, or inorganic particles in the coating formulation, wherein providing at least one of a binder, a cationic mordant, or inorganic particles in the coating formulation comprises providing the cationic mordant at from approximately 5% by weight to approximately 20% by weight based one the coating formulation weight; and
    applying the coating formulation to a substrate.

13. A print medium for use in inkjet printing, comprising:
    a substrate and an ink-receiving layer, wherein the ink-receiving layer comprises crosslinked organic particles having a particle size of less than approximately 1 μm and wherein the crosslinked organic particles are porous, present in a coating formulation at at least approximately 50% by weight, and are selected from the group consisting of: polyvinylalcohol particles, gelatin particles, polyamine particles, polyimide particles, cellulose particles, polyethylene oxide particles, polypropylene particles, derivatives thereof, and mixtures thereof.

14. The print medium of claim 13, wherein the crosslinked organic particles absorb inkjet ink applied to the print medium.

15. The print medium of claim 13, wherein the crosslinked organic particles consist of crosslinked polyvinylalcohol particles.

16. The print medium of claim 13, wherein the crosslinked organic particles are formulated to absorb at least two times their weight of water.

17. The print medium of claim 13, wherein the crosslinked organic particles are formulated to absorb at least four times their weight of water.

18. The print medium of claim 13, wherein the crosslinked organic particles have pores that occupy up to approximately 60% of a volume of the crosslinked organic particles.

19. The print medium of claim 13, wherein the crosslinked organic particles comprise at least one cationic monomer group.

20. The print medium of claim 13, wherein the ink-receiving layer comprises voids in amount ranging from approximately 0.3 cc/g to approximately 2.0 cc/g.

21. A print medium for use in inkjet printing, comprising:
a substrate and an ink-receiving layer, wherein the ink-receiving layer comprises crosslinked organic particles having a particle size of less than approximately 1 μm, wherein the ink-receiving layer comprises voids in amount ranging from approximately 0.3 cc/g to approximately 2.0 cc/g. and wherein the crosslinked organic particles are porous, present in a coating formulation at least approximately 50% by weight, and are selected from the group consisting of: polyvinylalcohol particles, gelatin particles, polyamine particles, polyimide particles, cellulose particles, polyethylene oxide particles, polypropylene particles, derivatives thereof, and mixtures thereof.

* * * * *

UNITED STATES PATENT AND TRADEMARK OFFICE
CERTIFICATE OF CORRECTION

PATENT NO. : 7,507,439 B2  Page 1 of 2
APPLICATION NO. : 10/840741
DATED : March 24, 2009
INVENTOR(S) : Tienteh Chen et al.

It is certified that error appears in the above-identified patent and that said Letters Patent is hereby corrected as shown below:

In column 17, lines 16-17, in Claim 1, after "medium" delete "having porous and swellable properties".

In column 17, line 18, in Claim 1, after "formulation" insert -- having porous and swellable properties --.

In column 17, line 19, in Claim 1, after "weight" delete "of crosslinked organic particles".

In column 17, line 20, in Claim 1, before ", wherein" insert -- of crosslinked organic particles --.

In column 17, line 22, in Claim 1, delete "approximately 1 μm;" and insert -- 1 μm, --, therefor.

In column 17, line 31, in Claim 2, after "formulation" insert -- having porous and swellable properties --.

In column 17, line 37, in Claim 3, after "formulation" insert -- having porous and swellable properties --.

In column 17, line 37, in Claim 3, after "weight" insert -- based on the coating formulation weight --.

In column 17, line 42, in Claim 4, after "formulation" insert -- having porous and swellable properties --.

In column 17, line 42, in Claim 4, after "weight" insert -- based on the coating formulation weight --.

Signed and Sealed this

Twenty-second Day of June, 2010

David J. Kappos
*Director of the United States Patent and Trademark Office*

CERTIFICATE OF CORRECTION (continued)
U.S. Pat. No. 7,507,439 B2

In column 17, line 52, in Claim 6, after "formulation" insert -- having porous and swellable properties --.

In column 17, line 52, in Claim 6, after "weight" insert -- based on the coating formulation weight --.

In column 18, line 2, in Claim 9, delete "one" and insert -- on --, therefor.

In column 18, line 46, in Claim 12, delete "polyamime" and insert -- polyamine --, therefor.

In column 18, line 57, in Claim 12, delete "one" and insert -- on --, therefor.

In column 18, line 62, in Claim 13, after "than" insert -- or --.

In column 18, lines 62-63, in Claim 13, delete "1μm and" and insert -- 1μm, --, therefor.

In column 18, line 64, in Claim 13, after "porous," insert -- are --.

In column 18, line 65, in Claim 13, after "by" insert -- weight based on the coating formulation --.

In column 18, line 66, in Claim 13, delete "of:" and insert -- of crosslinked --, therefor.

In column 18, line 66, in Claim 13, before "gelatin" insert -- crosslinked --.

In column 18, line 67, in Claim 13, before "polyamine" insert -- crosslinked --.

In column 18, line 67, in Claim 13, before "polyimide" insert -- crosslinked --.

In column 18 and 19, line 67 and 1 (respectively), in Claim 13, before "cellulose" insert -- crosslinked --.

In column 19, line 1, in Claim 13, before "polyethylene" insert -- crosslinked --.

In column 19, lines 1-2, in Claim 13, before "polypropylene" insert -- crosslinked --.

In column 19, line 2, in Claim 13, before "particles" insert -- oxide --.

In column 19, line 2, in Claim 13, after "particles," delete "derivatives thereof,".